(12) United States Patent
Beran

(10) Patent No.: US 11,122,380 B2
(45) Date of Patent: Sep. 14, 2021

(54) PERSONAL ROBOT ENABLED SURROUND SOUND

(71) Applicant: Sony Interactive Entertainment Inc., Tokyo (JP)

(72) Inventor: Erik Beran, Belmont, CA (US)

(73) Assignee: Sony Interactive Entertainment Inc., Tokyo (JP)

( * ) Notice: Subject to any disclaimer, the term of this patent is extended or adjusted under 35 U.S.C. 154(b) by 0 days.

(21) Appl. No.: 15/901,848

(22) Filed: Feb. 21, 2018

(65) Prior Publication Data

US 2019/0082281 A1   Mar. 14, 2019

Related U.S. Application Data

(60) Provisional application No. 62/556,109, filed on Sep. 8, 2017.

(51) Int. Cl.
| | |
|---|---|
| *H04S 7/00* | (2006.01) |
| *H04R 5/02* | (2006.01) |
| *H04R 5/04* | (2006.01) |
| *G05D 1/02* | (2020.01) |
| *H04R 1/32* | (2006.01) |
| *H04S 3/00* | (2006.01) |

(Continued)

(52) U.S. Cl.
CPC .......... *H04S 7/303* (2013.01); *G05D 1/0274* (2013.01); *G05D 1/0282* (2013.01); *H04R 1/323* (2013.01); *H04R 5/02* (2013.01); *H04R 5/04* (2013.01); *H04S 7/30* (2013.01); *B25J 9/162* (2013.01); *B25J 9/1697* (2013.01); *G05D 1/0231* (2013.01); *H04R 27/00* (2013.01); *H04R 2201/025* (2013.01); *H04R 2205/024* (2013.01); *H04S 3/008* (2013.01); *H04S 7/301* (2013.01); *H04S 2400/01* (2013.01); *Y10S 901/01* (2013.01)

(58) Field of Classification Search
CPC .......... H04S 7/303; H04S 7/301; H04S 3/008; H04S 2400/01; H04R 5/04; H04R 5/02; B25J 9/162; B25J 9/1697; G05D 1/0231; Y10S 901/01

See application file for complete search history.

(56) References Cited

U.S. PATENT DOCUMENTS

| | | | |
|---|---|---|---|
| 9,716,930 B1 * | 7/2017 | Lin ........................ | H04R 1/026 |
| 2010/0076600 A1 * | 3/2010 | Cross ...................... | H04W 4/70 |
| | | | 700/259 |

(Continued)

*Primary Examiner* — Ping Lee
(74) *Attorney, Agent, or Firm* — Penilla IP, APC

(57) ABSTRACT

Methods and systems are provided for providing one or more sound component to a viewer within a media presentation space by a robot having one or more speakers. A method includes an operation for establishing a connection to a media device that is presenting media content to the viewer, and an operation for capturing input from a plurality of sensors for obtaining a map of the media presentation space. The method additionally provides for identifying a position of the viewer and a speaker configuration in the media presentation space. The method allows the robot to move to a location based on the map of the media presentation space, the position of the viewer and the speaker configuration. Moreover, the method provides an operation for receiving one or more sound components for presentation to the user.

19 Claims, 13 Drawing Sheets

(51) Int. Cl.
*B25J 9/16* (2006.01)
*H04R 27/00* (2006.01)

(56) References Cited

U.S. PATENT DOCUMENTS

| | | | |
|---|---|---|---|
| 2012/0208660 A1* | 8/2012 | Mayers | A63B 69/0071 |
| | | | 473/447 |
| 2013/0041648 A1* | 2/2013 | Osman | H04S 7/304 |
| | | | 704/2 |
| 2014/0185812 A1* | 7/2014 | Van Achte | H04S 5/005 |
| | | | 381/18 |
| 2015/0098596 A1* | 4/2015 | Noah | H04S 7/301 |
| | | | 381/303 |
| 2017/0150263 A1* | 5/2017 | Dair | H04R 5/02 |
| 2017/0262045 A1* | 9/2017 | Rouvinez | G06F 3/011 |
| 2019/0239012 A1* | 8/2019 | Wong | H04R 1/026 |

* cited by examiner

PERSONAL ROBOT ENABLED SURROUND SOUND

CLAIM OF PRIORITY

This application is a non-provisional application of U.S. Provisional Patent Application No. 62/556,109, filed Sep. 8, 2017, entitled "PERSONAL ROBOT ENABLED SURROUND SOUND," which is herein incorporated by reference.

FIELD OF THE DISCLOSURE

The present disclosure relates generally to robots and more particularly to methods and systems for delivering surround sound audio components to a user of media content via one or more speakers of a personal robot or speakers controlled by the personal robot.

BACKGROUND

Smart speakers such as Amazon's Echo, Apple's HomePod, and Google's Google Home are becoming increasingly popular devices for users to access content. For example, smart speakers allow users to enjoy audio content such as music, audiobooks, and podcasts through built in speakers. However, the functionality of current smart speakers does not carry over to media presentation environments such as for viewing a movie, viewing broadcast television, or while gaming. For example, when a consumer is viewing a program on television of a home entertainment system, current smart speakers generally do not augment the viewing or listening experience. Similarly, when a user is engaged with a video game on a personal computer or a gaming console, current smart speakers do not augment the gaming experience by providing additional sound components such as surround sound components.

It is in this context that embodiments arise.

SUMMARY

Embodiments of the present disclosure relate to methods and systems for augmenting a user's audio experience while viewing programming on an entertainment system or while playing video game. In one embodiment, a method is disclosed for providing one or more additional surround sound components to a viewer within a media presentation space by a robot having one or more speakers. The method includes operations for establishing a connection with a media device that is presenting media content to the viewer and for capturing input from a plurality of sensors for obtaining or constructing a map of the media presentation space. The method further includes operations for identifying a position of the viewer in the media presentation space and for identifying a speaker configuration in the media presentation space. The method provides for the robot moving to a location based on the map of the media presentation space, the position of the viewer, and the speaker configuration. Moreover, the method includes operations for receiving one or more additional sound components associated with the media content from the media device and for presenting the one or more additional sound components via the one or more speakers associated with the robot.

In another embodiment, a system for providing one or more sound components to a viewer within a media presentation space is disclosed. The system includes a communications link configured for establishing a connection with a media device, wherein the media device is for presenting media content to the viewer within the media presentation space. The system also includes a plurality of sensors for obtaining data associated with the media presentation space, the plurality of sensors including one or more cameras. According to some embodiments, the data associated with the media presentation space may be used to construct a map of the media presentation space, to identify a position of the viewer within the media presentation space, and to identify a speaker configuration present in the media presentation space. Moreover, according to these and other embodiments, the system includes a processor configured for processing the data associated with the media presentation space for determining a location within the media presentation space that the system is to move to for providing the one or more sound components. According to this embodiment, the system further includes a locomotion unit for moving the system to the location within the media presentation space and one or more speakers for delivering the one or more sound components to the viewers.

In another embodiment, a method for providing a sound component to a player of a video game by a robot is provided. The method includes an operation for establishing a connection with a computing device executing the video game, wherein the video game includes an interactive character. The method provides operations for receiving locomotion instruction from the computing device, the locomotion instruction based on a position of the interactive character relative to a position of the player or a character of the player within the video game. The method further provides that the robot moves to a location in the real world environment based on the locomotion instruction. Moreover, the method provides operations for receiving the sound component from the computing device, the sound component being identified by the computing device to be associated with the interactive character during said executing the video game and for delivering the sound component to the user from the location in the real world environment based on the locomotion instruction.

In some embodiments, it is contemplated that the media device for present media content to the viewer is to include a media player that is connected to a display. In other embodiments, the media device may include a tablet, laptop, personal computer, or a smartphone.

Other aspects of the disclosure will become apparent from the following detailed description, taken in conjunction with the accompanying drawings, illustrating by way of example the principles of the disclosure.

BRIEF DESCRIPTION OF THE DRAWINGS

The disclosure may best be understood by reference to the following description taken in conjunction with the accompanying drawings in which.

DETAILED DESCRIPTION

Figure 1:
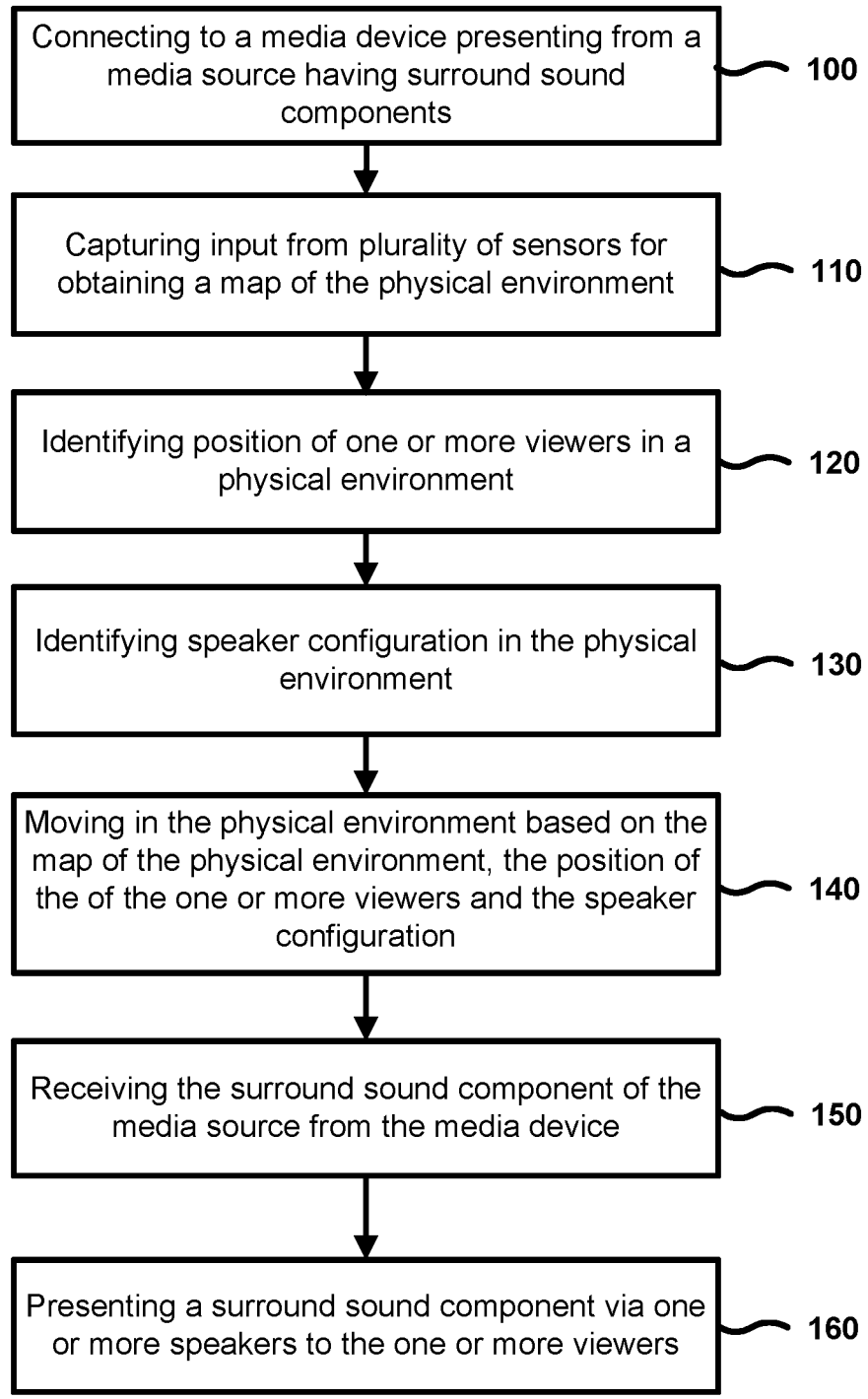
FIG. 1 shows an overall flow of a method for providing a surround sound component to one or more viewers using a robot having locomotion and equipped with one or more speakers, according to one embodiment.

The following embodiments describe methods, computer programs, and apparatuses for enabling a personal robot to deliver audio components such as surround sound to users in a media presentation space. It will be obvious, however, to one skilled in the art, that the present disclosure may be practiced without some or all of these specific details. In other instances, well known process operations have not been described in detail in order to not unnecessarily obscure the present disclosure.

Smart speakers such as Amazon's Echo, Apple's HomePod, and Google's Google Home are becoming increasingly popular devices for users to access virtual assistants and to interface with home automation platforms. Smart speakers also allow users to enjoy audio content such as music, audiobooks, and podcasts through built-in speakers.

The functionality of current smart speakers is limited, however, in the context of media presentation environments such as for viewing a movie, viewing broadcast television, or gaming. For example, when a consumer is viewing a program on a television screen, current smart speakers generally do not augment the viewing or listening experience Likewise, when a consumer is playing a video game on a personal computer or a gaming console, current smart speakers are unable to augment the gaming experience by providing additional sound components such as surround sound.

Often, limitations of current smart speakers to augment program viewing and gaming experiences for users stem from a lack of connectivity between a smart speaker and a media playing device, a type and configuration of speakers found in smart speakers, a lack of mobility of smart speakers, and a lack of awareness of the media sources. Thus, there is a need for and a benefit to having a smart speaker that can augment and enrich a consumer's experience while viewing a program or playing a video game on an entertainment system (e.g., home theater, console gaming device, PC gaming device, tablet, or smartphone) by providing sound components (e.g., surround sound) that is in addition to existing audio capabilities of the consumer's entertainment system.

Systems, methods, and apparatuses described here enable audio augmentation to an entertainment device or system using a personal robot that is equipped with speakers and locomotion. According to one embodiment, a robot is able to detect an existing speaker configuration of an entertainment system and determine a configuration for augmenting the existing audio set up with surround sound channels. For example, a robot may detect (e.g., by communication, interrogation, pairing, or dynamic polling or pulling of data) that a particular entertainment system includes a TV display of a certain size, a sound bar having a left, center, and right output, and a low frequency effect (LFE) output. The robot may then determine a configuration to augment the existing 3.1-channel array of speakers with two additional channels, for example to produce a 5.1-channel speaker configuration. The robot may obtain two additional channels of audio from a media source associated with the entertainment system that supports 5.1-channel configuration (e.g., Dolby Digital 5.1 or DTS 5.1).

In another embodiment, an interactive video game may be executed by a computing device such as a game console and presented to a player on a display. A robot may establish a connection with the computing device executing the video game in order to receive positioning and audio data. The video game may include an interactive character that speaks to the player or the player's in-game character. The robot may receive position and orientation data of the interactive character relative to the player's character within the game. Moreover, the robot may receive a sound component associated with the interactive character such as a portion of an in-game dialogue. The robot may then position itself relative to the player in a physical environment according to the position and orientation data of the interactive character and subsequently present the sound component such as the portion of in-game dialogue.

As a result, the player is presented with the audio component associated with the interactive character as it would sound if the interactive character were present in the physical environment. That is, the sound component associated with the interactive character is made to sound to the player as if the interactive character were in "real-life" because the sound component is presented to the player at a distance and orientation in the physical environment that corresponds with the interactive character's position and orientation within a virtual environment of the video game. In another sense, the player is presented with the audio component associated with the interactive character as it would sound if the player were present in the virtual game environment. As a result, the methods, system, and computer programs presented herein provide a technical benefit and improvement to existing audio systems by providing a more enriched audio experience via the above described sound augmentation.

As used herein, "dynamic real-life sound" refers to a presentation of sound components to a user by one or more speakers, for example, of a personal robot, at a distance or location or orientation relative to the user in a real world space that corresponds to a virtual distance or location or orientation of a sound-emitting entity (e.g., an interactive character) relative to the user or a character of a user within a virtual space. Dynamic real-life sound can provide a more accurate and life-like audio experience, especially for discrete sound emitting point sources, such as that of an in-game character.

As used herein, a "surround sound component" refers to an audio channel or audio component associated with content that is intended to be presented to user of the content from areas within a content presentation space that is in addition to the right, center, and left audio channels. As non-delimiting examples, a surround sound component could refer to an audio channel that is intended for a left surround speaker, a right surround speaker, a back surround speaker, a back left surround speaker, or a right back surround speaker, according to certain surround sound standards.

In another embodiment, a user may be viewing content on a mobile computing device such as a laptop, a tablet, or a smartphone. A personal robot may establish a connection with the mobile computing device to receive additional audio channels and/or audio components for presentation to the user. The robot may map the user's physical environment using a plurality of sensors in order to determine an optimal location and orientation to present the audio channel or component to the user.

FIG. 1 shows an overall flow of a method for providing a surround sound component to one or more viewers using a robot equipped with one or more speakers, according to one embodiment. The method includes an operation 100 for connecting to a media device presenting content from a media source having surround sound components. According to some embodiments, the media device may include any one of the following: DVD player, Blu-Ray player, SONY PlayStation 3, SONY PlayStation 4, Microsoft Xbox 360, Microsoft Xbox ONE, Nintendo Wii, Nintendo Wii U, Nintendo Switch, Amazon Fire TV, Google Chromecast, Roku TV, Apple TV, NVidia Shield TV, Smart TV platforms, TiVo, etc. The media device may also include personal computers (PCs), laptops, tablets, smartphones, etc. The above list is not limited to any specific commercial product or brand as it is simply provided as examples.

By way of example, the media source may include any one of the following: a DVD, a Blu-Ray Disc, Digital TV broadcast, satellite broadcast video stream over the Internet (e.g., Netflix, Hulu, PlayStation Vue, etc.), etc. According to the embodiment shown, the surround sound component may be from any one of the following surround sound standards: Dolby Surround, Dolby Digital 5.1, DTS 5.1, Dolby Digital EX, DTS-ES, Dolby Digital Plus, Dolby TrueHD, DTS-HD High Resolution Audio, DTS-HD Master Audio, Dolby Atmos, DTS:X, (or future versions not yet standardized), etc. According to various embodiments, the media device of operation 100 is capable of receiving and decoding these and other surround sound formats.

According to the embodiment in FIG. 1, the method then flows to operation 110, which serves to capture input from a plurality of sensors for obtaining a map of the physical environment. The plurality of sensors may include proximity sensors, depth sensors, cameras, radar, infrared (IR) sensors, etc. It is also contemplated that, if a robot is to implement the method shown in FIG. 1, the robot may move within the physical environment while capturing input from the plurality of sensors to obtain a more complete map of the physical environment. Movement by the robot will use sensor data to avoid bumping into obstacles and to find and learn paths for movement within the given space.

The method shown in FIG. 1 then flows to operation 120, which serves to identify a position of one or more viewers in the physical environment, and to operation 130, which serves to identify a speaker configuration. According to one embodiment, the method is able determine a number of viewers in the physical environment and their respective locations. Moreover, the method is able to a speaker configuration that is present in the physical environment. In one embodiment, the method is able to detect a number and arrangement of speakers that are operational, for example, by capturing images of the speakers that are present in the physical environment, using a microphone to capture or record audio output of those speakers that are operational, and/or by communicating with the media device to determine which speakers are being outputted to by the media device and/or associated receiver.

The method of FIG. 1 then flows to operation 140, in which a robot implementing the method may move within the physical environment based on the information gathered in operations 110, 120, and 130. According to one embodiment, the robot may determine that an existing speaker configuration includes a left and right speaker that is built into a TV display associated with the media device. The robot may also determine that there is an audience of 4 persons sitting on a couch located about 10 feet away from the TV display. Moreover, the robot may determine that there is wall within the physical environment upon which sound may be reflected off to reach the audience of viewers. With this information, the robot may calculate a location within the physical environment to move to that will provide two additional audio channels that are surround sound components (e.g., left surround and right surround), according to one embodiment. Additionally, the robot, having augmentation speakers, may determine respective orientations for the augmentation speakers in terms of yaw and pitch (or other projections) in which to deliver the received surround sound components to the audience of viewers.

The method shown in FIG. 1 then flows to operations 150 and operation 160, which serves to present the received surround sound component to the audience of viewers at the location and with a speaker orientation.

Figure 2:
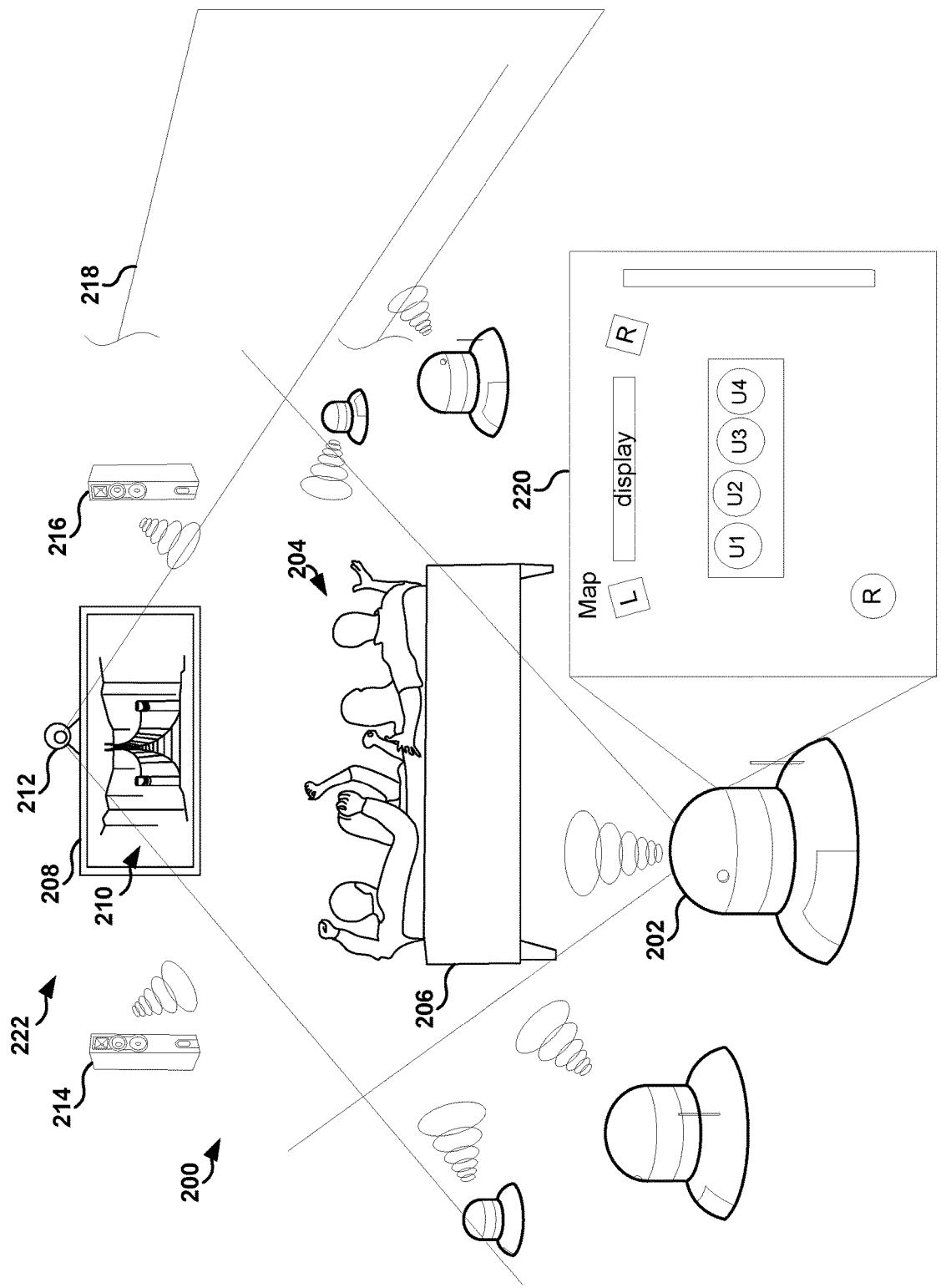
FIG. 2 shows a robot surveying a physical environment having an audience of viewers and an entertainment system to create a map of the physical environment, according to one embodiment.

FIG. 2 shows a robot 202 surveying a physical environment having an audience of viewers 204 and an entertainment system 222 for creating a virtual map 220 of the physical environment 200, according to one embodiment. According to the embodiment shown, the robot 202 may move about the physical space 200 in order to gather information about the contents of the physical space 200.

For example, the robot 202 may determine that the entertainment system 222 includes a display 208 that is presenting content 210, a left floor standing speaker 214, and a right floor standing speaker 216. Moreover, the robot 202 may identify that there is an audience 204 of four viewers sitting on a couch 206. In addition to the entertainment system 222 and the audience 204 that is identified, the robot 202 may further detect a presence of obstacles and walls that are present in the physical environment 200, such as wall 218. For example, wall 218 may be identified by robot 202 as a surface off of which audio may be reflected.

Also shown in FIG. 2 is a virtual map 220 produced by the robot 202 as a result of surveying the physical space 200 with the plurality of sensors. The virtual map 220 may be held in memory by robot 202, or can be stored or obtained from local storage or storage over a network. Updates can therefore be made to the virtual map 220 as changes are detected, as people move about the physical environment, and as things are moved within the physical environment, etc.

The virtual map 220 includes representation of the display 208, the left floor standing speaker 214, the right floor standing speaker 216, the audience 204 of 4 viewers, the couch 206, as well as the wall 218. As a result of virtual map 220, the robot 202 is provided with information with respect to areas within the physical environment 200 to which it is free to move to. Additionally, the robot 202 can use the map to determine optimal locations to deliver surround sound components and/or dynamic real-life sound components.

As noted above, the robot 202 is capable of mapping the physical environment using a plurality of sensors, including one or more cameras, stereoscopic cameras, radar, IR sensors, ultrasonic sensors, GPS, Wi-Fi, depth sensors, etc.

Moreover, the robot 202 maybe also assess acoustic properties of the physical environment 200 in addition to mapping physical aspects of the physical environment 200. For example, the robot 202 may emit a test sound in the direction of wall 208 that is capture by a microphone of the robot 202 in order to measure an acoustic reflectivity of the wall 208 or any object in a room or space. Additionally, there may be an audience-facing camera 212 that captures images of the physical environment 200 that may augment information provided by the plurality of sensors of the robot 202.

Figure 3A:
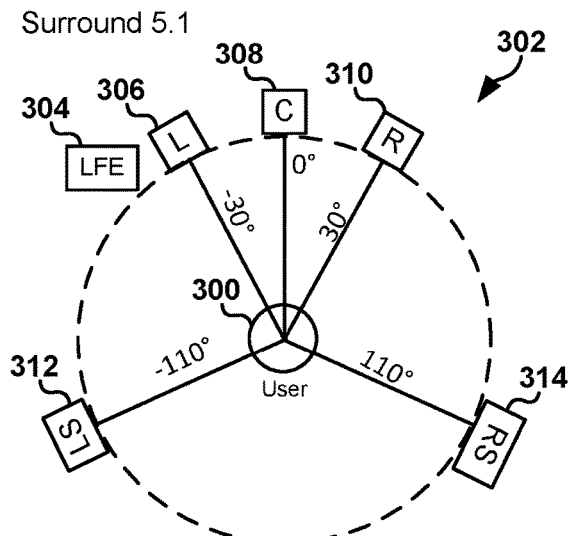
FIG. 3A shows a schematic diagram of a 5.1-channel surround sound configuration having left, center, right, left surround, right surround, and low frequency effect (LFE) speakers, according to one embodiment.

FIG. 3A shows a schematic diagram of a media presentation space 302 with a 5.1-channel surround sound configuration having a left speaker 306, a center speaker 308, a right speaker 310, a left surround speaker 312, a right surround speaker 314, and a low frequency effect (LFE) speaker 304 (e.g., subwoofer), according to one embodiment. According to the exemplary embodiment shown, a user 300 is present in the media presentation space 302 directly in front of the center speaker 308. If the center speaker 308 is used as a reference, the left speaker 306 and the right speaker 310 are shown to be at an angle of −30° and 30° relative to the center speaker 308, respectively. Other placements for the left, center, and right speakers 306, 308, and 310 are also possible.

Also, according to the embodiment shown in FIG. 3A, the left surround speaker 312 is shown to be at an angle of −110° and the right surround speaker 314 is shown to be at an angle of 110° relative to the center speaker 308. Of course, other angular placements of the left surround and right surround speakers 312 and 314 are also possible. For example, the left surround speaker 312 may be placed anywhere between −90° and −110°, or between −60° and −180° and the right surround speaker 314 between 90° and 110°, or between 60° and 180°, relative to the center speaker 308. Although LFE speaker 304 is shown to be at a particular position in the media presentation space 302, generally speaking, the angular placement of the LFE speaker 304 is not critical.

Figure 3B:
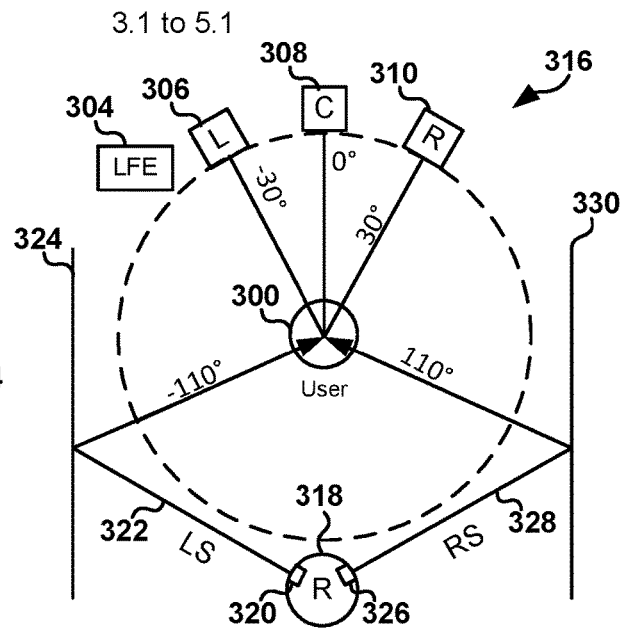
FIG. 3B shows a schematic diagram of 5.1-channel surround sound configuration provided by left, center, right, LFE speakers and two speakers of a robot, according to one embodiment.

FIG. 3B shows a schematic diagram of media presentation space 316 having a 5.1-channel surround sound configuration enabled by a robot 318 that augments an existing 3.1-channel speaker configuration with a left surround component 322 and a right surround component 328. In particular, the existing 3.1-channel speaker configuration includes a left speaker 306, a center speaker 308, a right speaker 310, and an LFE speaker 304. The existing 3.1-channel speaker configuration is capable of providing stereo sound, but not necessarily surround sound.

According to the embodiment should, a left surround component 322 and a right surround component 328 are provided by robot 318 via a first speaker 320 and a second speaker 326, respectively. The left surround component 322 is shown to be reflected off of a left wall 324 while the right surround component 328 is shown to be reflected off a right wall 330. Moreover, the left surround component 322 is shown to arrive to the user 300 at an angle of about −110° relative to the center speaker 308 while the right surround component 328 is shown to arrive at an angle of 110°. As a result, the user 300 is provided with a surround sound experience in the media presentation space 316 that mimics that of the media presentation space 302 of FIG. 3A.

Although the left surround component 322 and the right surround component 328 are shown to be incident on the user at about −110° and 110°, respectively, other angles are possible. For example, the left surround component 322 may arrive at user 300 anywhere between 90° and −110°, or between −60° and −180°. Likewise, the right surround component 328 may form an angle relative to the center speaker 308 anywhere between 90° and 110°, or between 60° and 180°. Moreover, although the left and right surround components 322 and 328 are shown to travel symmetrical paths to become incident on the user 300 at symmetrical angles, this does not have to be the case. For example, the left and right surround components 322 and 328 may travel asymmetrical paths (as shown in more detail below) and also arrive at user 330 from different angles.

In another embodiment of augmenting a 3.1-channel speaker configuration to provide a 5.1-channel speaker configuration, two robots may be used, one of which provides a left surround component and the other of which provides the right surround component.

Figure 3C:
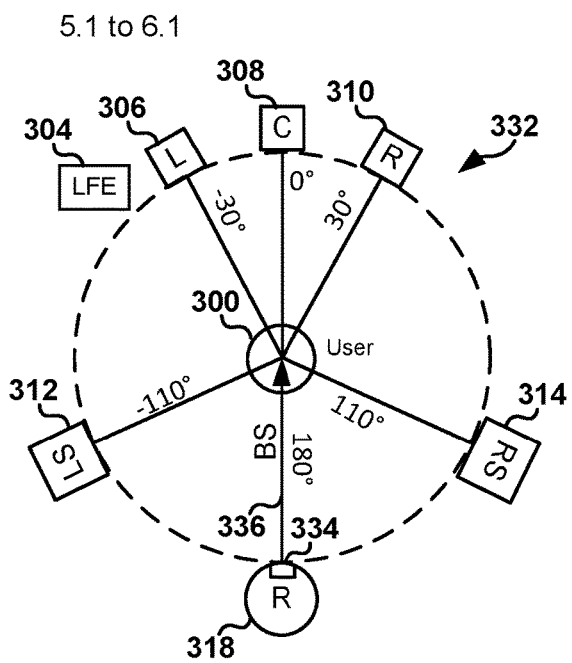
FIG. 3C shows a schematic diagram of a 6.1-channel surround sound configuration that is enabled by providing a 5.1-channel array of speakers with a speaker of a robot, according one embodiment.

FIG. 3C shows a schematic diagram of a media presentation space 332 having a 6.1-channel surround sound configuration enabled by a robot augmenting an existing 5.1-channel array of speakers, according one embodiment. The existing 5.1-channel array of speakers includes a left speaker 306, a center speaker 308, a right speaker 310, a left surround speaker 312, a right surround speaker 314, and a LFE speaker 304. According to the embodiment shown, the robot 318 provides a back surround component 336 via speaker 334 to the user 300 from behind the user 300 (e.g., about 180° relative to the center speaker 308).

According to some embodiments, the back surround component 336 may be a discrete audio channel or a matrixed audio channel. Furthermore, the back surround component 336 may reach user 300, for example, at any angle relative to the center speaker 308 between −170° and 170° (e.g., between 170° and 210°), or between −100° and 100° (e.g., between 100° and 260°).

Figure 3D:
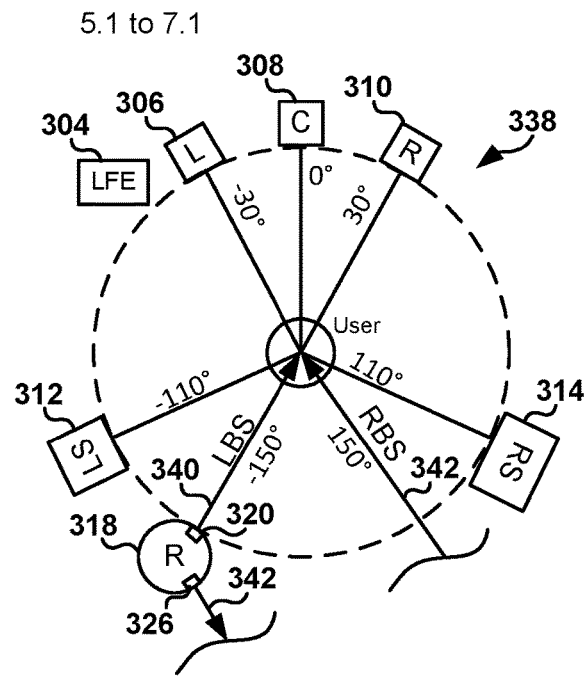
FIG. 3D shows a schematic diagram of a 7.1-channel surround sound configuration that is enabled by providing a 5.1-channel array of speakers with output from two speakers of a robot, according to one embodiment.

FIG. 3D shows a schematic diagram of a media presentation space 338 having a 7.1-channel surround sound configuration that is enabled by augmenting a native 5.1- channel array of speakers with output from two speakers of a robot, according to one embodiment. The native 5.1-channel array of speakers, similar to the embodiment shown in FIG. 3C, include a left speaker 306, a center speaker 308, a right speaker 310, a left surround speaker 312, a right surround speaker 314, and a LFE speaker 304. According to the embodiment shown, the robot 318 provides two additional surround sound components to user 300, including a left back surround component 340 and a right back surround component 342, from a first speaker 320 and a second speaker 342, respectively.

In one embodiment, the robot may deliver one of the two back surround components to user 300 without reflecting sound off of a wall, while the second of the two is reflected off of one or more walls before reaching user 300. In another embodiment, both of the two back surround components of a 7.1-channel configuration may be reflected off respective walls before reaching the user 300. In still other embodiments, both of the two back surround components of a 7.1-channel configuration may be delivered to the user 300 without having been reflected off a surface.

For embodiments in which one audio component travels a greater distance than the other before reaching a target such as the user 300, latency may be applied to the component having the shorter path. In other embodiments, a slightly different timing used for delivering respective sound components may be applied to the component having a longer path, for example, by shifting a track associated with the component forward in time. In FIG. 3D for example, if left back surround component 340 travels a path of about 5 meters before reaching user 300, whereas a right back surround component 342 travels a path of about 25 meters before reaching user 300, the left back surround component 340 may arrive about 59 milliseconds (ms) sooner than the right back surround component 343 does. As a result, there may be a perceptible latency in sound to an average user.

According to some embodiments, the robot 318 may calculate a difference in the respective paths taken by two sound components in order to determine a degree or amount of phase to shift to one or both tracks associated with the two sound components. For example, the robot 318 may shift the track associated with the right back surround component 342 forward in time by about 59 ms to compensate for the greater amount of time it takes for right back surround component 342 to arrive at user 300 relative to the left back surround sound component 340.

Although the left back surround component 340 is shown to form an angle of −150° relative to the center speaker 308, other angular configurations are possible. For example, it is contemplated that the left back surround component 340 have an angular location of between −135° to −150°, or between −90° to −180°. Likewise, although the right back surround component 342 is shown to have an angular specification of 150°, it is contemplated that the right back surround component 342 may be delivered by the robot 318 at an angular location anywhere between 135°-150°, or between 90° and 180°.

Figure 4A:
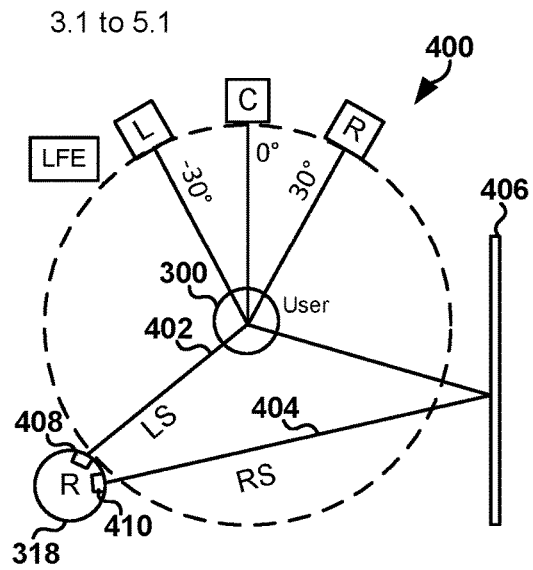
FIG. 4A shows a schematic diagram of a 5.1-channel surround sound configuration that is enabled by providing a 3.1-channel array of speakers with output from two speakers of a robot, according to an additional embodiment.

FIG. 4A shows a schematic diagram of a media presentation space 400 having a 5.1-channel surround sound configuration that is enabled by augmenting a 3.1-channel array of speakers with output from two speakers of a robot 318, according to an additional embodiment. According to the embodiment shown, a left surround component 402 is delivered to the user 300 by a direct path, whereas a right surround component 404 is reflected off of surface 406 before reaching user 300. At noted earlier, the difference in latency that user 300 may perceive between the left surround component 402 and the right surround component 404 may be adjusted for by shifting the audio track associated with the right surround component 404 ahead in time by some amount.

Furthermore, a first speaker 408 that outputs the left surround component 402 may do so at a volume or intensity that is different than that of a second speaker 410 that outputs the right surround sound component 404. For example, the robot 318 may determine that the second speaker 410 is to output the right surround component 404 at a higher volume or intensity than the first speaker 408 outputs the left surround component 402 because of the greater distance traveled by the right surround component 404 and because of the reflection off of surface 406.

Figure 4B:
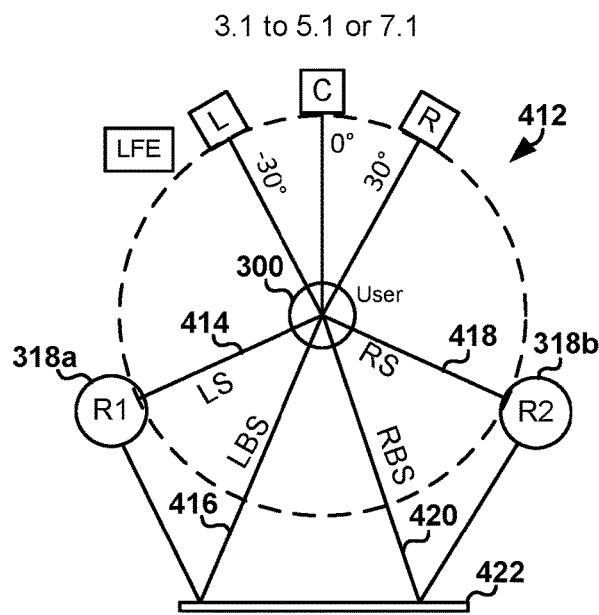
FIG. 4B shows a schematic diagram of a 7.1-channel surround sound configuration that is enabled by providing a 3.1-channel array of speakers with output from speakers of two robots, according to one embodiment.

FIG. 4B shows a schematic diagram of a media presentation space 412 having a 7.1-channel surround sound configuration that is enabled by augmenting a 3.1-channel array of speakers with output from speakers of two robots 318a and 318b. A first robot 318 is shown to output a left surround component 414 and a left back surround component 416, the latter of which is reflected, for example, against a surface 422. Similarly, a second robot 318b provides a right surround component 418 and a right back surround component 420, the latter of which reflects off of surface 422 before reaching user 300.

In another embodiment, the first and second robots 318a and 318b may augment the existing 3.1-channel configuration with the left surround component 414 and the right surround component 418, respectively, and but not the left back surround component 416 or the right back surround component 420. As a result, a 5.1-channel audio configuration may be provided to user 300 in addition to a 7.1-channel configuration, depending upon user preference and on the audio standard being used by the media source.

Figure 4C:
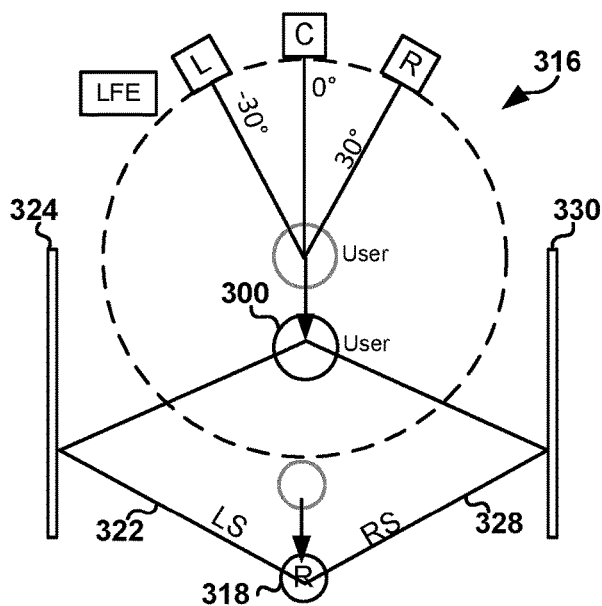
FIGS. 4C and 4D show schematic diagrams of a robot moving in synchrony with a user to maintain surround sound components being delivered to the user, according to certain embodiments.

FIG. 4C illustrates a media presentation space 316 having a 5.1-channel speaker configuration enabled by a robot 318 augmenting an existing 3.1-channel configuration with surround sound components 322 and 328, wherein the robot 318 moves within the media presentation space 316 in synchrony with a movement of a user 300. Similar to the media presentation space 412 shown in FIG. 3B, the robot 318 augments the existing audio set up with a left surround component 322 that is reflected off of left wall 324 and a right surround component 328 that is reflected off of right wall 330.

According to some embodiments, a user 300 may choose to move within the media presentation space 316 for any number of reasons. In the embodiment shown, the user 300 is shown to move away from a center speaker. It is contemplated that the robot 318 may track a position of user 300 in real time and perform movements in synchrony with the movement of the user 300 to continue to ensure that the left and right surround components 322 and 328 continue to reach the user 300 as the user 300 is in movement.

Because of the particular geometry of the media presentation space 316, the robot 318 is shown to move a similar distance in a similar direction as user 300. However, it may be the case that the robot 318 is to move along a path that is not in similar directions or distances as a path taken by a user 300 during movement in order to maintain delivery of the left and right surround components 322 and 328. Moreover, it may be the case that a first and second speaker used for outputting surround sound components 322 and 328 changes a position and/or orientation on the robot 318 to accommodate the trajectories of outputted audio to user 300.

Figure 4D:
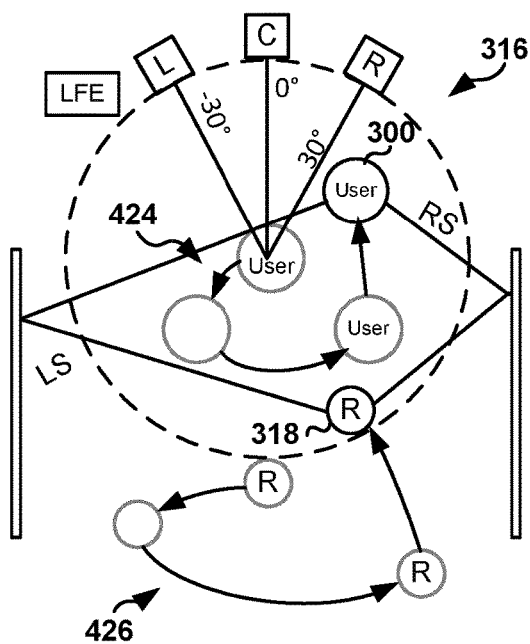

FIG. 4D illustrates a robot 318 performing movements 426 within a media presentation space 316 synchronously with movements 424 of a user 300 to maintain delivery of a left and right surround component to the user 300. As noted above, the position and orientation of the speakers of the robot 318 outputting the left and right surround component may need to change in synchrony with the movements 426 of the robot 318 and the movements 424 of the user 300.

Figure 5A:
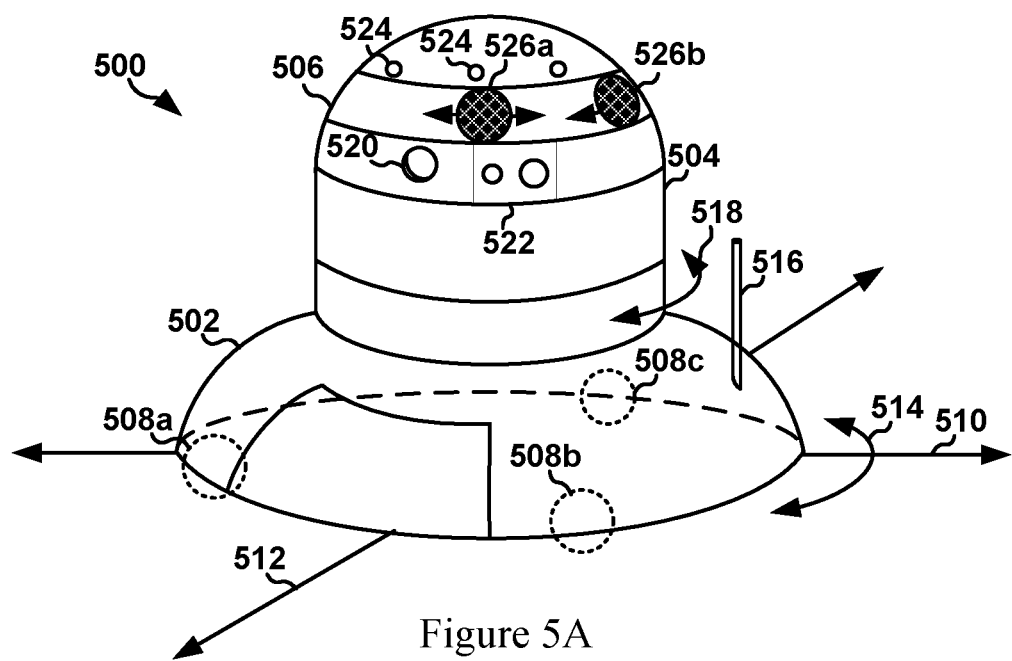
FIGS. 5A and 5B show an embodiment of a robot and associated components.

FIG. 5A illustrates an exemplary embodiment of a robot 500 capable of implementing methods discussed herein. The exemplary robot 500 includes a base 502, a body 504, and a head 506. Movement of the robot 500 is accomplished by a set of wheels 508a-508c, the number and type of which may vary depending on various embodiments. The set of wheels 508a-508c is driven by one or more motors (not shown), which is powered by one or more batteries (also not shown) disposed in the robot 500.

The robot 500 is shown to be capable of latitudinal movement 510 (e.g., forward and backward), longitudinal movement 512 (e.g., side to side), and angular movement 514 (e.g., swiveling). The body 504 is also shown to be capable of angular movement 518.

According to the embodiment shown in the FIG. 5A, the robot 500 includes a camera 520, a sensor module 522, light emitting diodes (LEDs) 524, an antennae 516, a first speaker 526a, and a second speaker 526b. As noted above, the camera 520 is capable of capturing images of the physical environment for obtaining a map of the environment. Moreover, the robot 500 may be equipped with facial recognition functionality for identifying particular users within the physical environment by analyzing the captured images, according to one embodiment. Furthermore, there may be additional cameras disposed at other locations on the robot 510 for obtaining a 360° view of the physical environment. In certain embodiments, the additional cameras allow for stereoscopic imaging of the physical environment.

Sensor module 522 may contain a plurality of sensors including proximity sensors, depth sensors, IR sensors, radar, ultrasonic sensors, etc. The particular type and placement of any of the aforementioned sensors will vary depending on the particular implementation of various embodiments. For example, proximity sensors may be placed on the perimeter of the base 502 of robot 500 for detecting obstacles within the physical environment.

LEDs 524 may be disposed at various locations on robot 500 and provide additional information to a tracking system for tracking of the robot 500. For example, certain embodiments may have one or more cameras configured to capture images of the physical space, which may be used by a tracking system to track a position and orientation of the robot 500. The tracking system may relay the tracked position and orientation information to the robot 500.

Figure 5B:
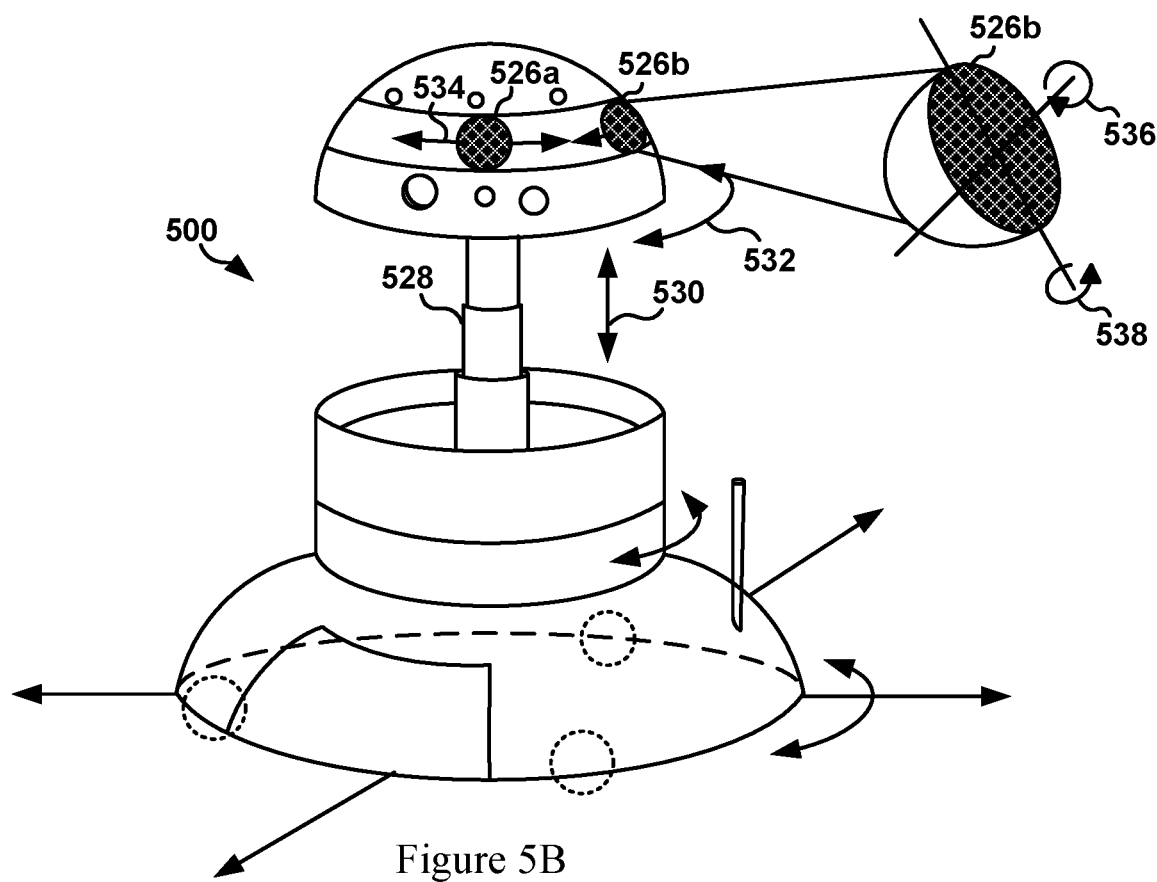

FIG. 5B shows an additional configuration of the robot 500 in which a portion of the robot 500 is elevated 530 by a telescoping device 528. Also shown in FIG. 5B are various degrees of freedom provided to both of speakers 526a and 526b, according to some embodiments. For example, the first speaker 526 is capable of angular movement 534, and movement in pitch 536 and yaw 538. The same is true of the second speaker 526b. As a result, both the first and second speaker 526a and 526b is capable of facing or pointing toward many directions in order to deliver audio components to a user.

Figure 6:
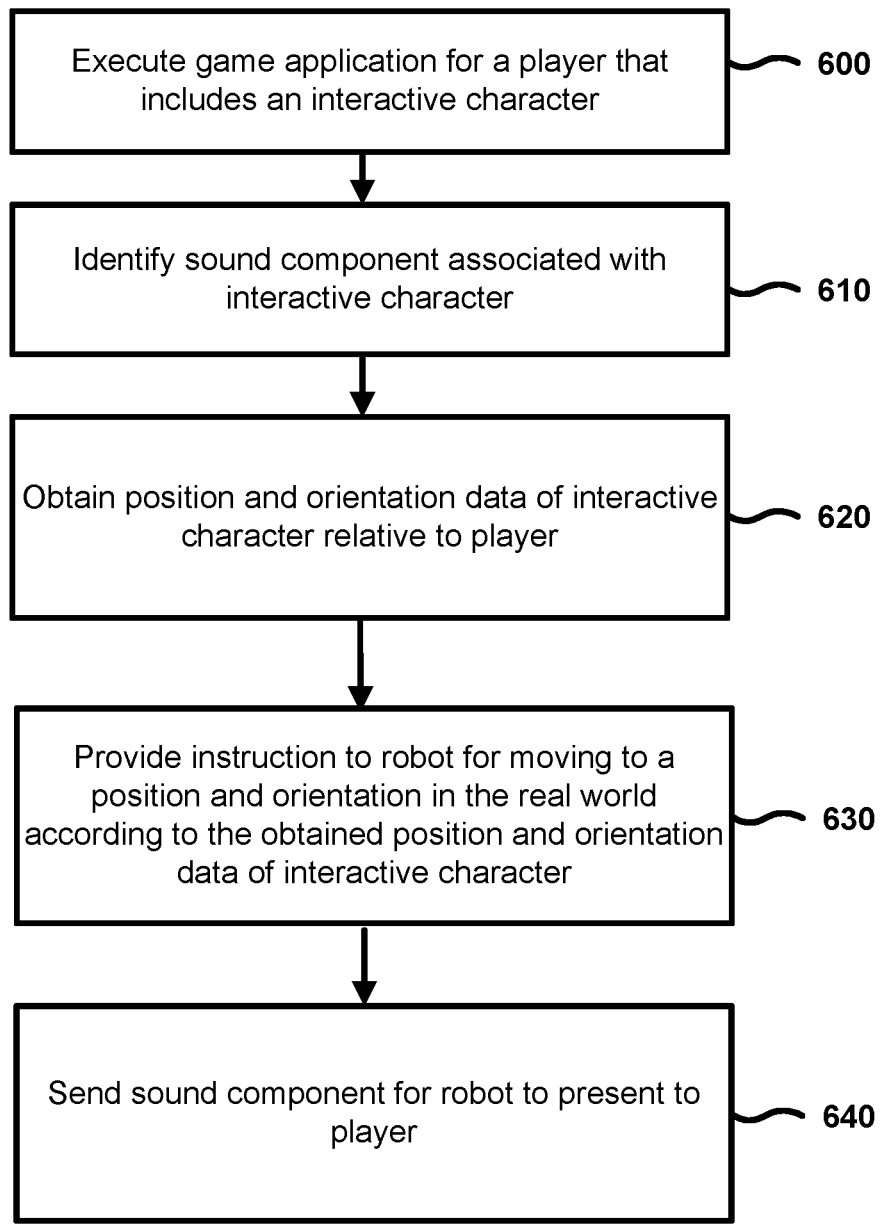
FIG. 6 shows an overall flow of a method for generating an audio component associated with an in-game character during execution of a video game and delivering the audio component to a user of the video game via a robot, according to one embodiment.

FIG. 6 shows an overall flow of a method for generating an audio component associated with an in-game character during execution of a video game and delivering the audio component to a player of the video game via a robot. The method represents one embodiment of achieving dynamic real-life sound (DRLS). The method includes operation 600 that executes a game application for a player, the game application including an interactive character. According to certain embodiments, the execution of the game application may be performed by a game console, a personal computer, a laptop, a tablet, or a smartphone. The interactive character may include any in-game character that interacts with a player of the game, such as an ally, a guide, an enemy, a boss, a character played by an additional player, or a non-player character (NPC).

According to the embodiment shown in FIG. 6, the method then flows to operation 610, which serves to identify a sound component associated with the interactive character. It is contemplated that the sound component may include words spoken by the character, noises made by the character, noises made by an object of the character, or any other sound originating from the character or by an action of the character. For example, the sound component may include a piece of in-game advice dispensed by the character (e.g., "you ought to buy more grenades"), an utterance indicating that the character has been wounded (e.g., "ouch"), a snapping of a finger, a loading of a weapon, etc. If the interactive character is one that is controlled by an additional player (e.g., a remote online player), the sound component could include the additional player's voice. Generally speaking, the sound components associated with the interactive character are stored as sound files, for example as .WAV, .mp3, .ogg files, etc. During execution of the game application, one or more of these sound files may be loaded and played to provide audio to the video game. Some of these sound components may be unrelated to the interactive character, for example, a background soundtrack or theme song. Operation 610 is enabled to selectively identify those sound components that are associated with the interactive character. For example, operation 610 may identify, during execution of the game application that the interactive character is to utter words of encouragement, which is stored as "WOE12.wav" for the game application.

The method then flows to operation 620, which serves to obtain position and orientation data of the interactive character relative to the player or the player's in-game character. For example, operation 620 may determine that the interactive character is 3 meters away at a 3'O-clock position. Operation 620 may further determine that the interactive character is facing the player or the player's character (e.g., the interactive character is turned toward the player's character to provide the words of encouragement).

The exemplary method shown in FIG. 6 then proceeds to operation 630, which serves to provide instruction to a robot for moving to a position and orientation in the real world according to the position and orientation data obtained in operation 620. For example, operation 630 may instruct the robot to position itself at a 3'O-lock position 3 meters away from the player, and orient one or more speakers to be facing the player. While in some embodiments, the robot may be able to move to a position in the real world that closely matches the relative position of the interactive character in the game application, there may also be instances where such a close match is not easily obtained. For example, if the interactive character were farther away from the player or the player's character than the constraints in the physical environment would allow the robot to move to, the robot could alternatively mimic a farther away sounding sound component associated with the interactive character.

The method of FIG. 6 then flows to operation 640, which sends the sound component to the robot to be presented to the player. As a result, for example, operation 640 may present the words of encouragement, as encoded by the sound file WOE12.wav, to the player from a distance of 3 meters and direction of 3'O-clock. Moreover, the sound component may be presented in a direction that is toward the player in the real world. According to this embodiment, the player is provided with an audio experience of the sound component associated with the interactive character that accords with and is more accurate to the happenings within the game application experience. That is, there is an enhanced congruence between visual stimulus (e.g., visual effects) of a player and audial stimulus (e.g., sound effects) for the player, which enhances a realness and immersiveness the player experience.

Figure 7:
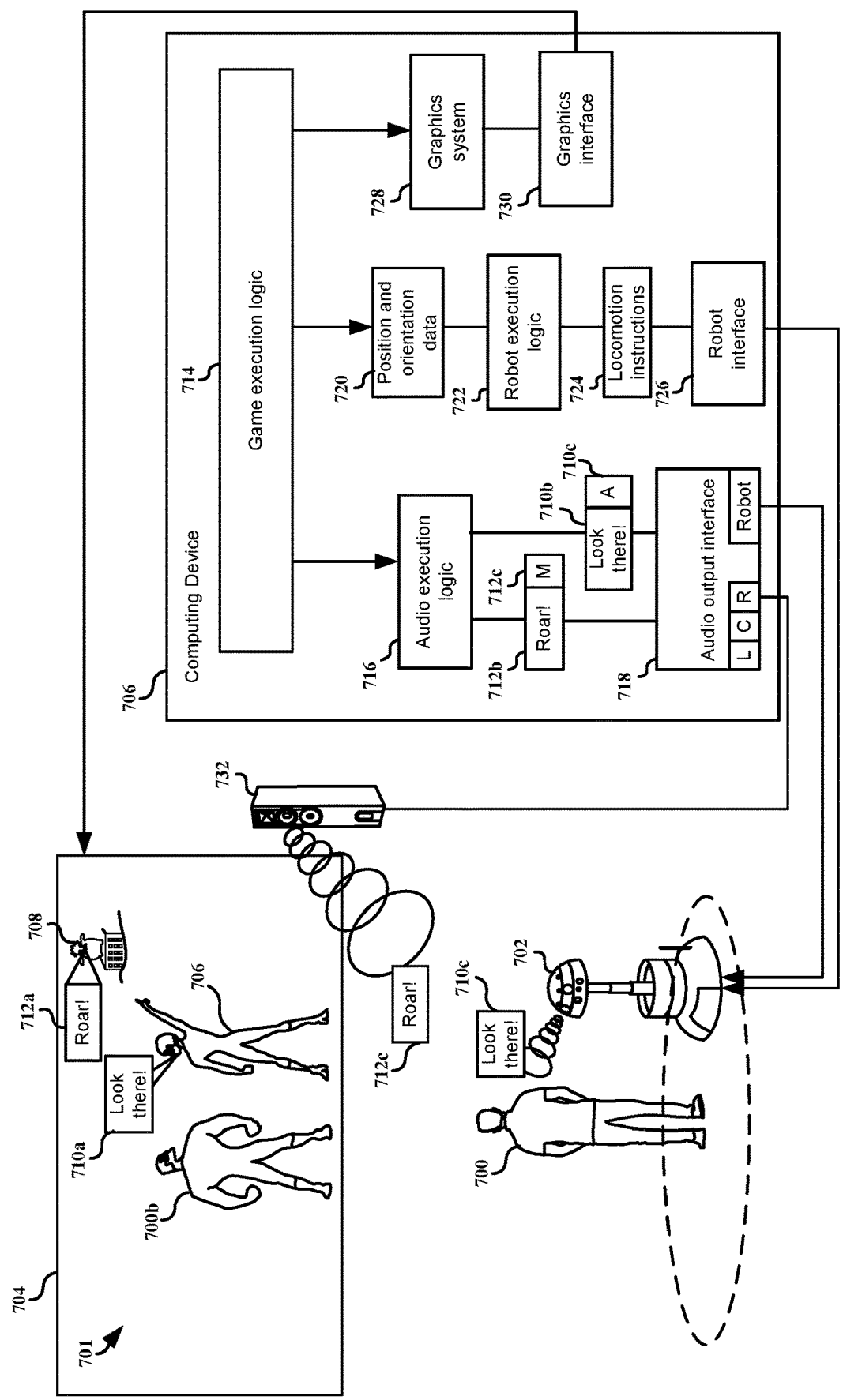
FIG. 7 is a conceptual illustration of an embodiment for generating various audio components during execution of a video game and selectively communicating one of the audio components to a robot for presentation to a player of the video game.

FIG. 7 is a conceptual illustration of an embodiment for generating various audio components during execution of a video game 701 and selectively communicating one of the audio components to a robot 702 for presentation to a player 700 of the video game 701, according to one embodiment. The video game 701 is shown to include a player character 700b that player 700 may control, an interactive character 706 and a monster 708, and presented by a display 704. A first audio component 710a, "look there!", and a second audio component 712a, "roar!" are representations of audio content within the video game 701. For example, the first audio component 710a is shown to be spoken by the interactive character 710a, whereas the second audio component 712a is shown to originate at monster 708.

A computing device 706 is shown to include a game execution logic 714, which executes the video game 701 being played. During execution of the video game 701 by the game execution logic 714, the application for the video game 701 may include instructions to present the first audio component 710a and the second audio component 712a. According to the embodiment shown, an audio execution logic 716 included in the computing device 706 is able to retrieve the first audio component file 710b and route it to an audio output interface 718 to be sent to the robot 702. The audio execution logic 716 is also able to identify that the second audio component file 712b should be routed to a right speaker 732 for output. Tags for both of the first and second audio component files 712b and 710b are shown to facilitate said routing.

In one embodiment, the audio execution logic 716 obtains game state information from the game execution logic to determine sources for various audio components and the locations for those sources. For example, the audio execution logic 716 may determine that the first audio component 710a originates from the interactive character 706 who is a particular distance away from player character 700b. As a result, the audio execution logic 716 may selectively communicate the first audio component file 710b to the robot 702 for presentation. The audio execution logic 716 may also determine that the second sound component 712a originates from a source that is not the interactive character 706 and that is some greater distance away. Thus, for the second sound component 712a, the audio execution logic 716 may route the second sound component file 712b to be presented by the right speaker 732, and not the robot 702.

According to other embodiments, the selective communication of various sound components to the robot 702 may be performed by the game execution logic 714. However, it will be appreciated that there may be various other embodiments having the selective communication of sound components to the robot 702 being performed by various other hardware, software, or firmware, without departing from the scope and spirit of the embodiments described here.

The game execution logic 714 is also shown to provide position and orientation data 720 of the interactive character 706 to a robot execution logic 722. For example, the position and orientation data 720 for the interactive character 706 may include directional data that defines a direction the interactive character 706 is located relative to the player character 700b. The position and orientation data 720 may also include data that defines a distance that separates the interactive character 702 from player character 700b. Moreover, the position and orientation data 720 may include data defining an orientation toward which the interactive character 702 is emitting or projecting the first audio component 710a. For example, whether the interactive character 702 has her head pointed forward or turned toward the player character 700b, the resulting sound of "look there!" may be perceived differently. As a result, position and orientation data 720 may also account for differences in directional projection of voices by tracking an orientation of the interactive character 706, and in some embodiments, a direction in which a head of the interactive character in pointing.

According to the embodiment shown, the robot execution logic 722 receives and processes the position and orientation data 720 in order to provide locomotion instruction 724 to the robot 702. For example, robot execution logic 722 may calculate, from an analysis of the position and orientation data 720, a location in the real world for the robot 702 to move to for presentation of the first audio component 710a. The robot execution logic 722 may then provide locomotion instruction 722 that instructs the robot 702 to move to the desired location in the real world space. The computing device is able to communicate locomotion instructions 724 via robot interface 726, which may include one or more of a number of wireless interfaces such as Bluetooth, Wi-Fi, infrared, near field communication (NFC), and others.

The computing device 706 is also shown to include a graphics system 728, which may generate a series of video frames during execution of the video game 701 for displaying the video game 701 on the display 704, the video frames being communicated via a graphics interface 730.

According to the embodiment shown, robot 702 has moved to a location as instructed by locomotion instruction 724. Moreover, based on the locomotion instruction 724 obtained from the computing device 706, the robot 702 has also oriented a speaker to be pointed toward the user 700. As a result, the first audio component 710c is delivered to user 700 from a position and orientation that corresponds to the position and orientation of the interactive character 706 within the video game 701. As a result, the user 700 is made to hear the sound of the first audio component 710c as though he were inside the video game 701 as the player character 700b.

It is contemplated that the computing device 706 may, in some embodiments, be a part of robot 702. That is, it is envisioned that some embodiments of robot 702 may structurally house the computing device 706 for executing the video game 701. In other embodiments, the computing device 706 may be instantiated on a remote server for executing the video game 701. In still other embodiments, the computing device 706 may be a standalone device. Thus, it should be appreciated that the precise location of computing device 706 is not material to the scope and spirit of the presented embodiments.

Figure 8A:
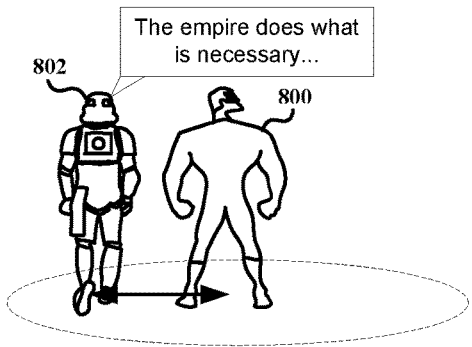
FIGS. 8A-8F show various additional embodiments for delivering audio components of in-game characters of a video game to a player.
Figure 8B:
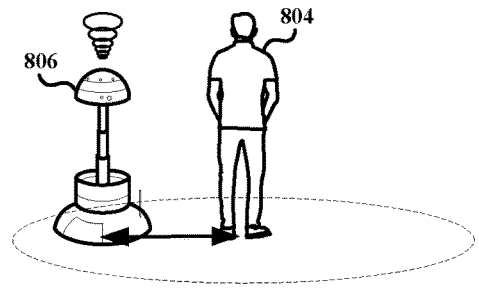

FIGS. 8A and 8B show additional embodiments of an interactive character 802 speaking to a player character 800. The interactive character 802 is shown to be on the left hand side of the player character 804 and facing in a forward direction while saying: "The Empire does what is necessary." According to some embodiments, the robot 806 is instructed to position itself at coordinates within the real world space relative to player 804 that are similar to the interactive character's 802 coordinates within the game relative to the player character 800. For example, if it is the case that the interactive character is 3 feet directly to the left of player character 800, the robot 806 may be positioned at 3 feet directly to the left of the player 804. Moreover, since the interactive character 802 is facing forward while speaking, the robot 806 is shown to emit the words of the interactive character 802 in a forward direction.

Figure 8C:
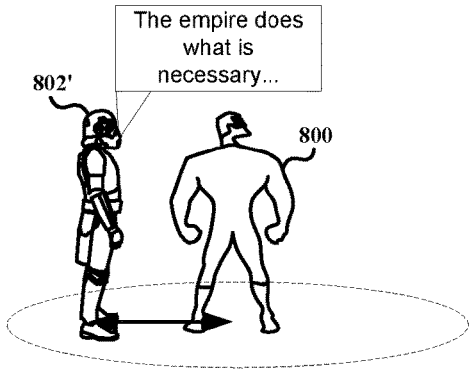
Figure 8D:
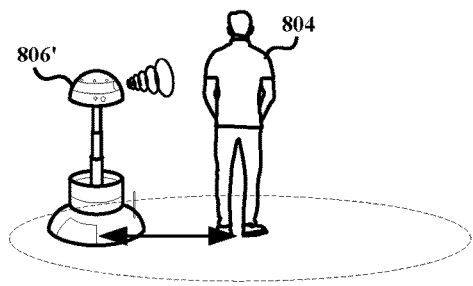

If the interactive character 802' is facing the player character 800 while speaking, as is the case in FIG. 8C, the robot 806' may accordingly orient a speaker and/or turn about its base in order to deliver the words of the interactive character 802' in a direction that is facing the player 804 (as shown in FIG. 8D).

If the interactive character 802" turns his head while saying the words "the Empire does what is necessary", the robot 806" may perform a similar turning movement while delivering the words of the interactive character 802". As a result, the robot is able to reproduce the spatial and directional properties of in-game audio within the real world.

Figure 8E:
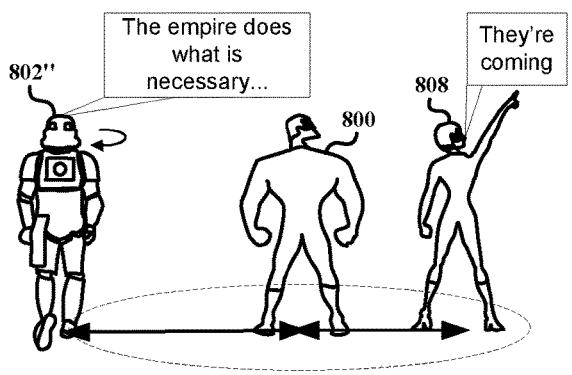
Figure 8F:
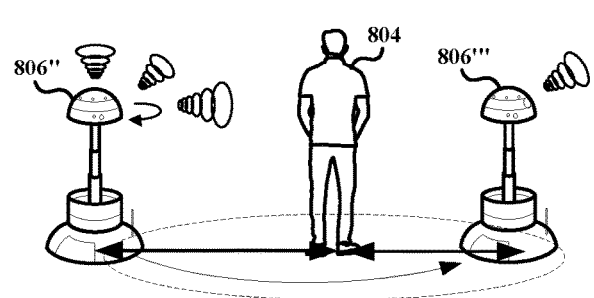

Also shown in FIG. 8E is a second interactive character 808 who says "They're coming" some period after the interactive character 802" speaks. According to the embodiment shown, the robot 806''' has moved from a prior location to a new location in the real world that corresponds to location of the second interactive character 808 relative to the player character 800. Moreover, the robot 806''' is shown to deliver a sound component corresponding to the words spoken by the second interactive character 808. As a result, the robot 806''' is able to deliver audio components originating from more than one source or more than one interactive character.

Figure 9:
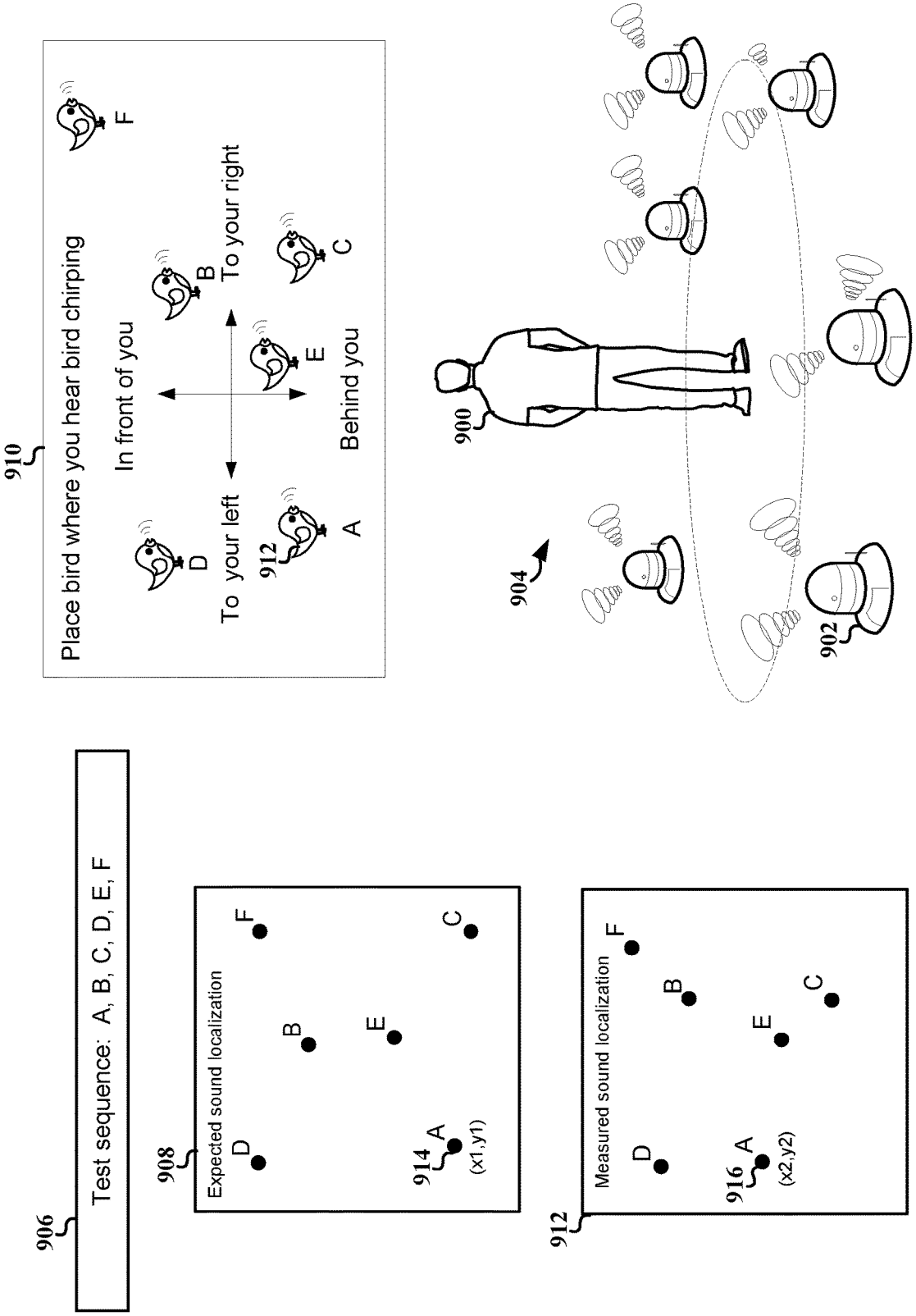
FIG. 9 shows an embodiment for obtaining a user's perceptive feedback on directionality of sound delivered by a robot in a media presentation space.

FIG. 9 shows a conceptual illustration usable for obtaining directional feedback on sound delivered by a robot 902 to a user 900 in a media presentation space 904, according to one embodiment. As shown in FIG. 9, a test sequence 906 of test sounds is presented by robot 902 to user 900 to measure sound localization by the user 900. In the embodiment shown, the test sequence 906 includes test sounds A-F that are chirping noises delivered by robot 902. According to some embodiments, the robot 902 may move around the media presentation space 904 to deliver the test sounds of the test sequence 906.

For each test sound of the test sequence 906, the user 900 is asked to perform object placement on an interface being displayed by display 910. During object placement, the user is asked to place a bird icon at a location within the interface that corresponds to where the user 900 perceives the sound to be originating from. According to some embodiments, user 900 is able to do this with a controller (not shown), or by pointing a finger. According to FIG. 9, user 900 is shown to have placed a bird icon 912 at an 8'O-clock position within the interface in response hearing test sound A. The user 900 is shown to do the same for a remainder of the test sequence 906. As a result, user feedback with respect to sound localization for the test sequence is obtained.

Also shown in FIG. 9 is a map of the measured sound localization 912 derived from the user feedback. The measured sound localization 912 includes coordinate data corresponding to each of the object placements within the interface performed by the user 900. As a result, the measured sound localization 912 provides not only directional information regarding sound localization, but also information on how far away the user 900 perceived the test sound originate from.

Associated with the test sequence 906 is a set or map of expected sound location 908 data points. Each of the points in the expected sound location 908 map represent a location where a certain test sound is expected to be perceived to originate from. The measured sound localization 912 data points may be compared with the expected sound localization 908 data points to provide feedback correction for robot training and/or learning.

Figure 10:
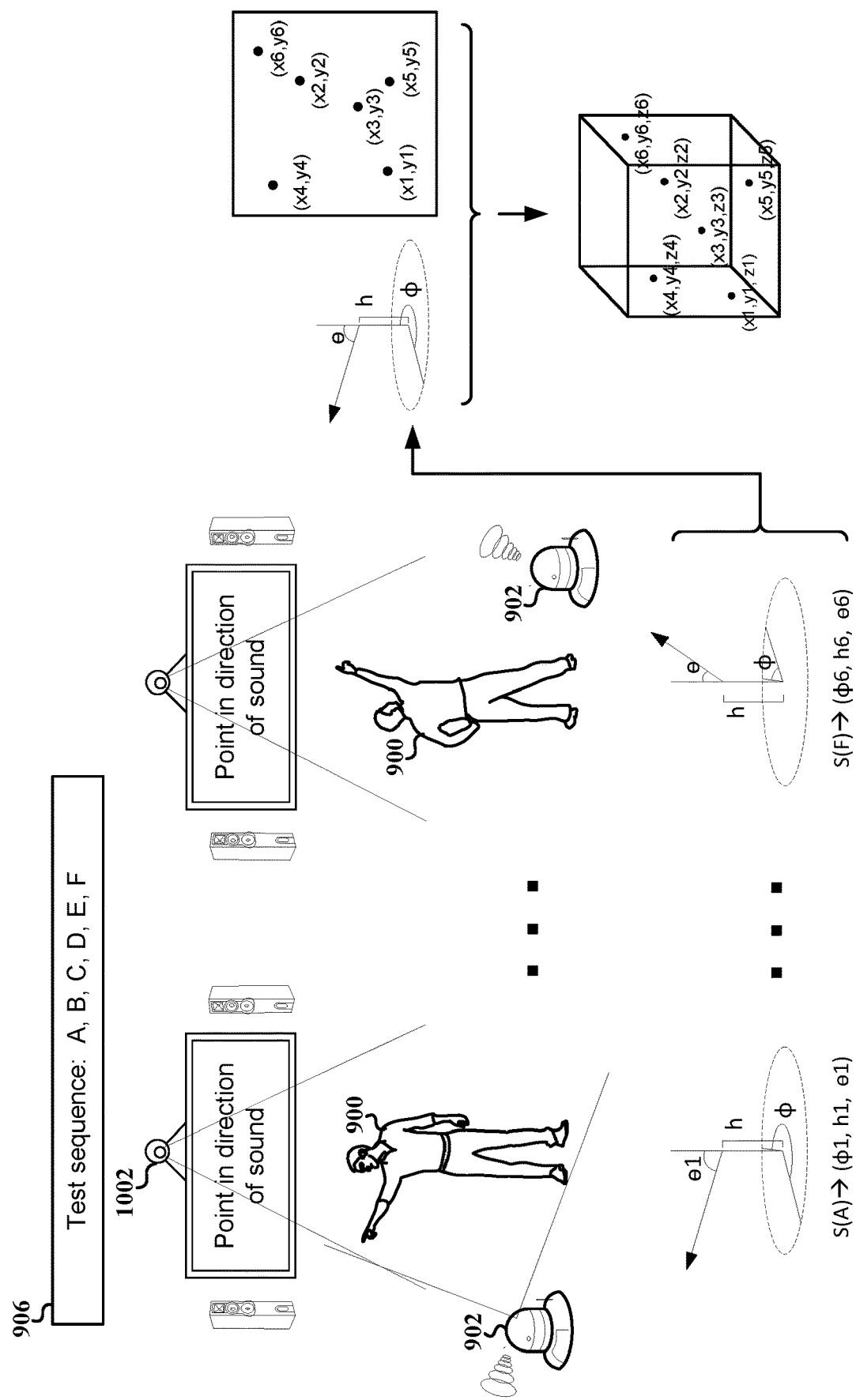
FIG. 10 shows an embodiment for obtaining feedback on sound localization of a user in response to sound delivered by a robot.

FIG. 10 shows an additional embodiment for obtaining feedback on sound localization of a user 900 in response to sound delivered by a robot 902, according to one embodiment. A user 900 is presented with a sound from a test sequence 906 by robot 902 and is asked to point in a direction of the sound (e.g., where the user perceives the sound to originate from). As the user 900 is pointing in the direction of the sound, a camera 1002 or a camera of robot 902 captures images of the user 900. The captured images may be analyzed to obtained coordinates defining the direction in which the user 900 is pointing. According to the embodiment shown, coordinate $\Phi$ describes an angular distance away from a reference angle, while coordinate h describes a height of user 900 or a shoulder of user 900, and $\Theta$ describes and angular distance away from a vertical axis that an arm of user 900 makes. As a result, the coordinates provide sound localization feedback with respect to a direction in which the user perceives the test sounds. The sound localization feedback process is shown to continue for the remainder of the test sequence 1000.

Also shown in FIG. 10 is a process for combining coordinate data (e.g., x and y coordinates) obtained from the sound localization feedback process of FIG. 9 with coordinate data (e.g., $\Phi$, h, $\Theta$) obtained from that of FIG. 10 to obtain 3-dimensional (3D) coordinates for sound localization in response to the test sequence. For example, coordinates $(x_1, y_1)$ and $(\Phi_1, h_1, \Theta_1)$ coordinates, both obtained in response to test sound A, may be combined to obtain 3-dimensional (3D) coordinates $(x_1, y_1, z_1)$. As a result, sound localization feedback in terms both direction and distance away in three dimensions may be obtained.

Figure 11:
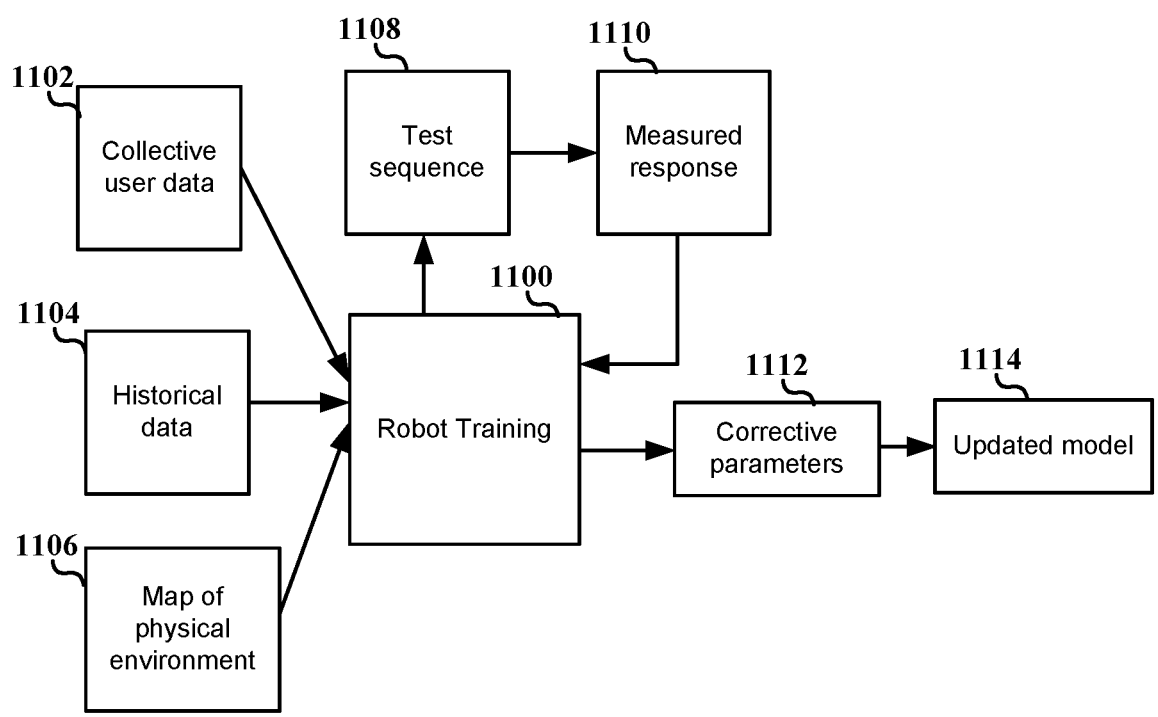
FIG. 11 shows a conceptual diagram illustrating robot training, according to one embodiment.

FIG. 11 shows a conceptual diagram illustrating robot training 1002, according to one embodiment. Robot training 1100 receives input data from collective user data 1102, historical data 1104, and map of physical environment 1106. The collective user data 1102 may include information from other robots at remote locations that, for example, are situated in media presentation spaces of a similar configuration. For example, if a robot is situated in a media presentation space that includes a 12×10 foot room and an entertainment system having a 3.1-channel speaker configuration, then the collective user data 1102 received by robot training 1100 may be selectively filtered for data related to similar media presentation spaces. The historical data 1104 includes data related to previous test sequences and measurements.

The map of physical environment 1106 includes a virtual map of the media presentation space, which may be updated periodically or in real-time to reflect changes in the media presentation space, as well as changes in user location within the media presentation space.

During robot training 1110, a test sequence 1108 is provided to a user for sound localization feedback (see FIG. 9 and FIG. 10). The resulting sound localization measured response 1110 is captured and fed back into robot training 1100. The measured response 1110 may be compared to expected sound localization points (see FIG. 9), which may be used to provide corrective parameters 1112. The result of robot training 1100 and the corrective parameters 1112 is an updated model 1114 that enables the robot to provide more accurate 3D sound that promotes a user's ability to localize a given sound to where the sound is intended to be perceived from. Thus, robot training enables the robot to learn how a user localizes sound within a given media presentation space. Moreover, the robot is able to learn how to present sounds to the user such that the particular user localizes sounds from whence they are intended (e.g., by a video game, or a program) to be heard.

Figure 12:
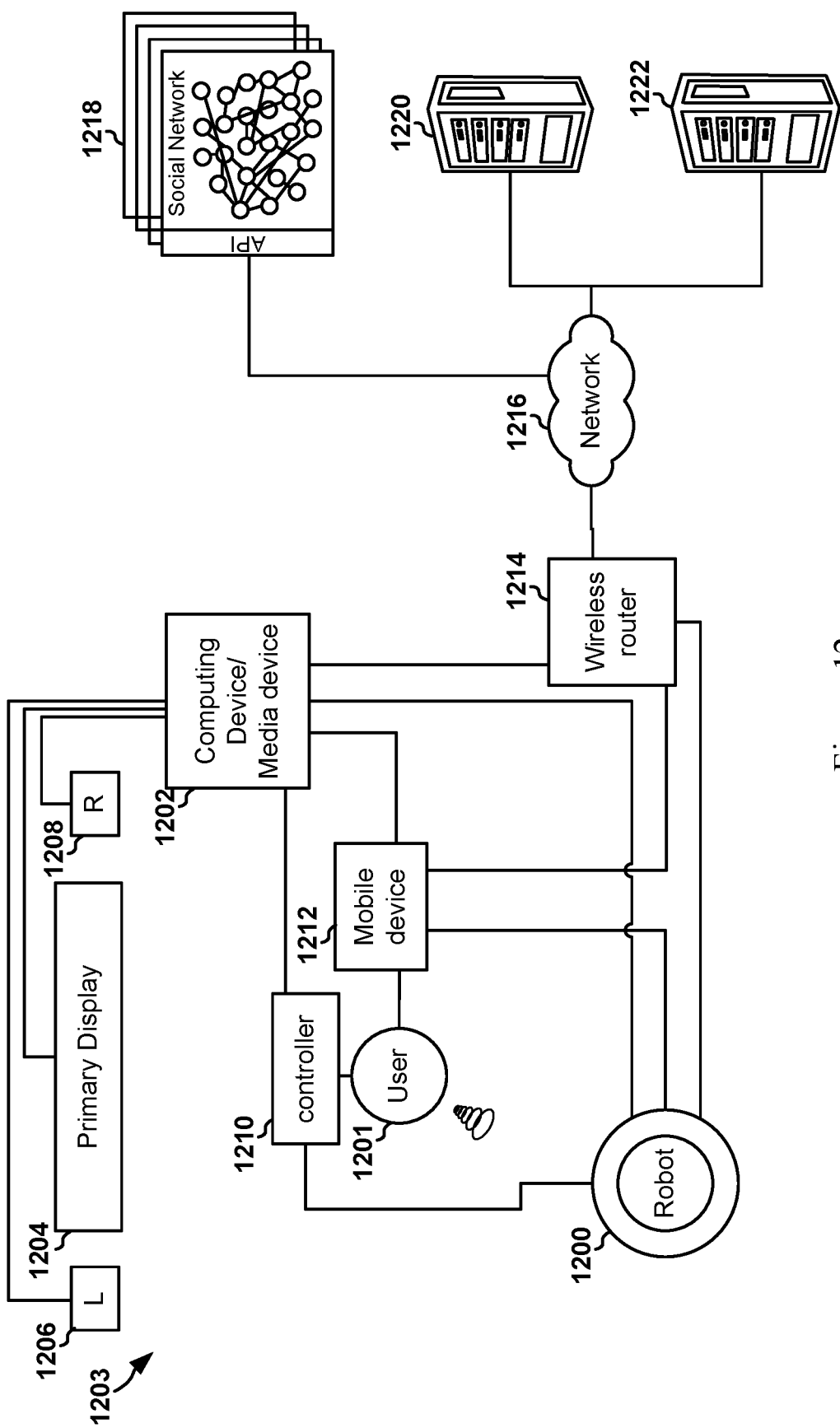
FIG. 12 shows a diagram of connectivity within a media presentation space having a robot, according to one embodiment.

FIG. 12 shows a diagram of connectivity within a media presentation space 1203 having a robot 1200, according to one embodiment. Robot 1200 is shown to communicate with a computing device/media device 1202, a mobile device 1212 of a user 1201, as well as a wireless router 1214. User 1201 is shown to interact with robot 1201 via voice command. Additionally, it is contemplated that user 1201 may interact with the robot 1200 via the mobile device 1212, via a controller 1210, or via gestures (not shown).

The robot 1200 is able to connect to the Internet via network 1216 and access a media server 1220, a robot server 1222, and one or more social networks 1218. As a result, the robot 1200 may obtain audio data from media server 1220, applications, maps, collective user data, and other data/software from robot server 1222, as well as user profile and user friend profile information from the one or more social networks 1218.

The computing device/media device 1202 is shown to be connected to a primary display 1204, a left speaker 1206, a right speaker 1208, as well as a controller 1210 and the mobile device 1212. The computing device/media device 1202, as discussed above, is configured to receive programming from network 1216 via wireless router 1214 to be presented on the entertainment system comprising the primary display 1204, the left speaker 1206, and the right speaker 1208. Additionally, since computing device/media device 1202 communicates with robot 1200, additional audio components may be provided to the robot 1200 so that the robot 1200 can augment existing audio.

Figure 13:
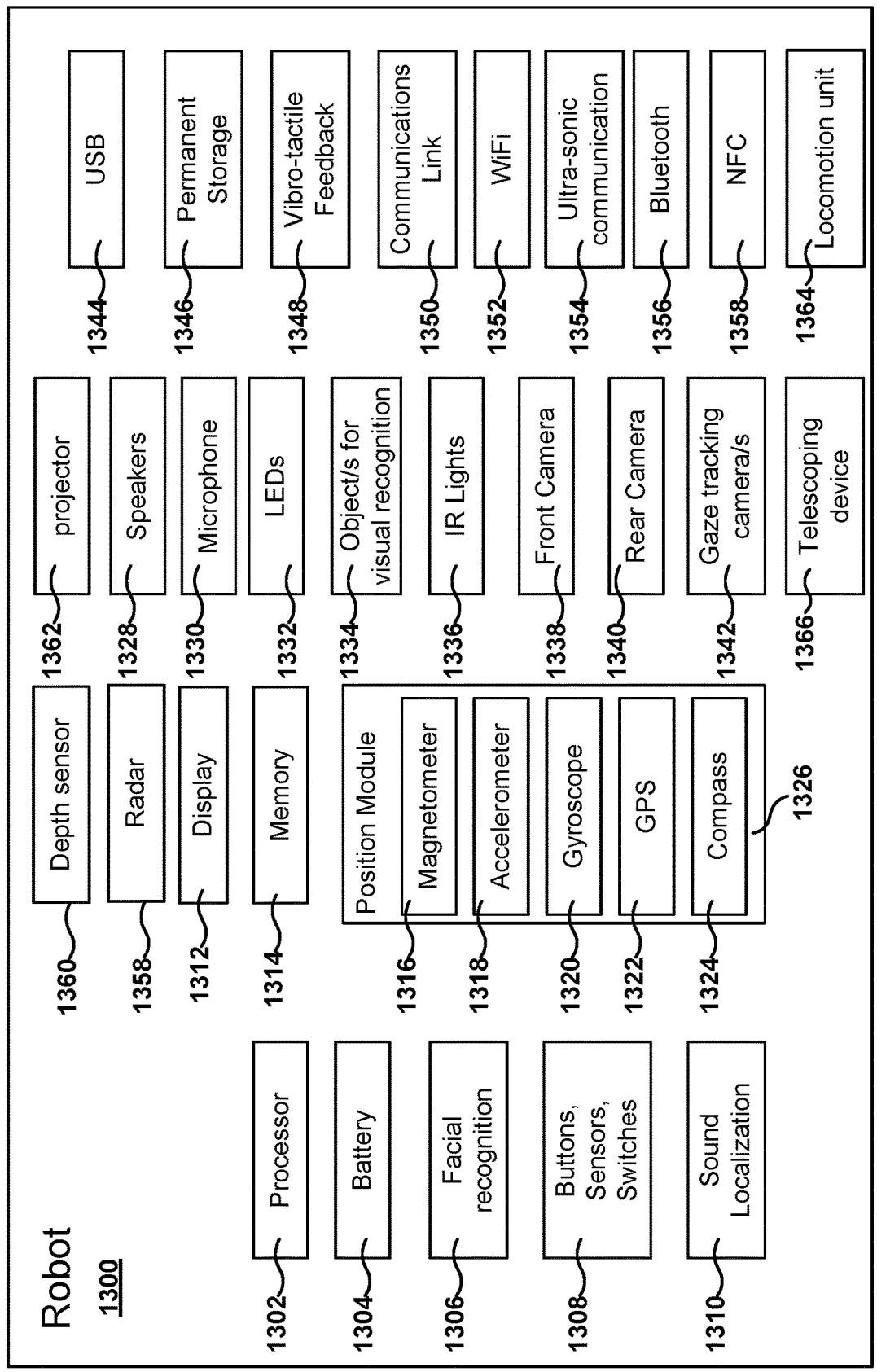
FIG. 13 illustrates an additional embodiment of a robot and some associated components.

FIG. 13 illustrates an additional embodiment of a robot 1300 that may be used with the presented method and/or system. Robot 1300 includes hardware such as processor 1302, battery 1304, facial recognition 1306, buttons, sensors, switches 1308, sound localization 1310, display 1312, and memory 1314. Robot 1300 is also shown to include a position module 1326 that comprises a magnetometer 1316, an accelerometer 1318, a gyroscope 1320, a GPS 1322, and a compass 1324. Further included in robot 1300 are speakers 1328, microphone 1330, LEDs 1332, object/s for visual recognition 1334, IR lights 1336, front camera 1338, rear camera 1340, gaze tracking camera/s 1342, USB 1344, permanent storage 1346, vibro-tactile feedback 1348, communications link 1350, WiFi 1352, ultra-sonic communication 1354, Bluetooth 1356, near field communication (NFC) 1358, depth sensor 1360, projector 1362, locomotion unit 1364, and telescoping device 1366.

Although the method operations were described in a specific order, it should be understood that other housekeeping operations may be performed in between operations, or operations may be adjusted so that they occur at slightly different times, or may be distributed in a system which allows the occurrence of the processing operations at various intervals associated with the processing.

One or more embodiments can also be fabricated as computer readable code on a computer readable medium. The computer readable medium is any data storage device that can store data, which can be thereafter be read by a computer system. Examples of the computer readable medium include hard drives, network attached storage (NAS), read-only memory, random-access memory, CD-ROMs, CD-Rs, CD-RWs, magnetic tapes and other optical and non-optical data storage devices. The computer readable medium can include computer readable tangible medium distributed over a network-coupled computer system so that the computer readable code is stored and executed in a distributed fashion.

Although the foregoing embodiments have been described in some detail for purposes of clarity of understanding, it will be apparent that certain changes and modifications can be practiced within the scope of the appended claims. Accordingly, the present embodiments are to be considered as illustrative and not restrictive, and the embodiments are not to be limited to the details given herein, but may be modified within the scope and equivalents of the appended claims.

What is claimed is:

1. A method for providing one or more sound components to a viewer within a media presentation space by a robot having one or more speakers, the method comprising:

establishing a connection with a media device, the media device for presenting media content to a display screen disposed at a viewing location within the media presentation space, the viewing location provides for a separation space between the viewer and the display screen;

capturing input from a plurality of sensors for obtaining a map of the media presentation space;

identifying, based on the map, a position of the viewer in the media presentation space, a speaker configuration in the media presentation space, and an obstacle in the media presentation space that is in addition to the display screen, the viewer and speakers of the speaker configuration;

determining a location the robot is to move to achieve a surround sound configuration within the media presentation space via the one or more speakers of the robot, the location to which the robot moves is one that approximates a location of a sound component visually depicted in the media content relative to a position of the viewer in the media presentation space viewing the media content;

receiving, from the media device, one or more sound components associated with the media content;

moving the robot to the location, while avoiding the obstacle, so that a sound output by the one or more speakers of the robot, together with the speaker configuration in the media presentation space, appears to correspond to said sound component visually depicted in the media content relative to the position of the viewer in the media presentation space viewing the media content; and outputting the sound by the one or more speakers of the robot when the robot moves to the location;

wherein the robot is configured to move to one or more additional locations within the media presentation space responsive to changes of the location of said sound components visually depicted on the display screen for the sound component as corresponding changes occur in the media content, and one of said locations is one that enables outputting the sound in the separation space between the viewer and the display screen.

2. The method of claim 1, wherein the location is further selected such that the one or more sound components during said presenting are unobstructed by the obstacle.

3. The method of claim 1, wherein the one or more sound components are one or more surround sound components, the one or more surround sound components are different from sound components of the speaker configuration.

4. The method of claim 1, wherein the speaker configuration is associated with a 1-channel, 2-channel, or 3-channel non-surround sound configuration, and wherein the one or more sound components that is output by the one or more speakers of the robot are associated with a 5-channel, 6-channel, or 7-channel to achieve the surround sound configuration.

5. The method of claim 1, further comprising:
determining that the speaker configuration is of a pre-existing surround sound configuration from said identifying the speaker configuration in the media presentation space;
wherein the one or more sound components are one or more additional surround sound components.

6. The method of claim 1, wherein the speaker configuration is associated with 5-channel surround sound configuration, and wherein the one or more sound components that is output by the one or more speakers of the robot are associated with a 6-channel or a 7-channel to achieve the surround sound configuration.

7. The method of claim 1, wherein said presenting the one or more sound components associated with the media content is in synchrony with said presenting the media content to the viewer.

8. The method of claim 1, wherein the location the robot moves to is behind the viewer when the viewer is viewing the display.

9. The method of claim 1, wherein the media presentation space includes a surface that is reflective of sound, and wherein at least one of the one or more sound components are delivered to the viewer by being reflected off of the surface.

10. The method of claim 1, wherein the one or more sound components include a first surround sound component and a second surround sound component.

11. A robot for providing one or more sound components to a viewer within a media presentation space, the robot comprising:
a communications link configured for establishing a connection with a media device, the media device configured for presenting media content to a display screen disposed at a viewing location within the media presentation space, the viewing location provides for a separation space between the viewer and the display screen;
a plurality of sensors for obtaining data associated with the media presentation space, the plurality of sensors including one or more cameras, the data associated with the media presentation space usable for constructing a map of the media presentation space, for identifying a position of the viewer within the media presentation space, for identifying a speaker configuration present in the media presentation space, and for identifying an obstacle within the media presentation space that is in addition to the display screen;
a processor configured for processing the data associated with the media presentation space for determining a location within the media presentation space that the robot is to move, the location to which the robot moves is one that approximates a location of a sound component visually depicted in the media content relative to a position of the viewer in the media presentation space viewing the media content;
a locomotion unit for moving the robot to the location within the media presentation space, while avoiding the obstacle, so that a sound output by one or more speakers of the robot, together with the speaker configuration in the media presentation space, appears to correspond to said sound component visually depicted in the media content relative to the position of the viewer in the media presentation space viewing the media content;
wherein the robot is configured to move to one or more additional locations within the media presentation space responsive to changes of the location of said sound components visually depicted on the display screen for the sound component as corresponding changes occur in the media content, and one of said locations is one that enables outputting the sound in the separation space between the viewer and the display screen.

12. The robot of claim 11, wherein the robot is configured to receive the one or more sound components associated with the media content from media device via the communications link, wherein the robot is configured to present the one or more sound components to the viewer from the location, and wherein the one or more sound components are one or more surround sound components, the one or more surround sound components are different from sound components of the speaker configuration.

13. The robot of claim 11, wherein the location is further determined such that the one or more sound components are unobstructed by the obstacle during said providing the one or more sound components to the viewer.

14. The robot of claim 11, wherein the one or more sound components are one or more additional surround sound components.

15. The robot of claim 11, wherein said providing the one or more components to the viewer occurs in synchrony with said presenting the media content to the viewer.

16. The robot of claim 11, wherein the processor is further configured to determine respective orientations for the one or more speakers based on the data associated with the media presentation space, and wherein the one or more speakers are configured to move to the respective orientations for said providing the one or more sound components.

17. A method for providing one or more sound components to a viewer within a media presentation space by a robot having one or more speakers, comprising:
establishing a connection with a media device, the media device for presenting media content to a display screen disposed at a viewing location within the media presentation space and being in connection with one or more existing speakers for presenting a first audio component to the viewer, the viewing location provides for a separation space between the viewer and the display screen;
capturing input from a plurality of sensors for identifying a position of the viewer, the one or more existing speakers and an obstacle in the media presentation space that is in addition to the display screen, the viewer and the one or more speakers;
determining a location within the media presentation space the robot is to move to provide a second audio component to the viewer, that augments the first audio component to provide a three-dimensional sound environment, the location to which the robot moves is one that approximates a location of a sound component visually depicted in the media content relative to a position of the viewer in the media presentation space viewing the media content, receiving, from the media device, the second audio component;

moving the robot to the location; and outputting at least part of the second audio component by the one or more speakers of the robot when the robot has moved to the location;

wherein the robot is configured to move to one or more additional locations within the media presentation space responsive to changes of the location of said sound components visually depicted on the display screen for the sound component as corresponding changes occur in the media content, and one of said locations is one that enables outputting the sound in the separation space between the viewer and the display screen.

18. The method of claim 17, wherein the media presentation space includes a wall that is reflective of sound, and wherein the second audio component is delivered to the viewer by being reflected off of the wall.

19. The method of claim 17, wherein the location is further determined such that the second audio component is unobstructed by the obstacle during said presenting.

\* \* \* \* \*